US012670914B2

(12) United States Patent
Brueckner et al.

(10) Patent No.: US 12,670,914 B2
(45) Date of Patent: Jun. 30, 2026

(54) EMOTION-AWARE VOICE ASSISTANT

(71) Applicant: CERENCE OPERATING COMPANY, Burlington, MA (US)

(72) Inventors: Raymond Brueckner, Blaustein (DE); Markus Funk, Neu-Ulm (DE)

(73) Assignee: CERENCE OPERATING COMPANY, Burlington, MA (US)

( * ) Notice: Subject to any disclaimer, the term of this patent is extended or adjusted under 35 U.S.C. 154(b) by 198 days.

(21) Appl. No.: 17/833,102

(22) Filed: Jun. 6, 2022

(65) Prior Publication Data

US 2023/0395078 A1     Dec. 7, 2023

(51) Int. Cl.
G10L 15/22     (2006.01)
G10L 17/26     (2013.01)
G10L 25/30     (2013.01)

(52) U.S. Cl.
CPC .............. G10L 17/26 (2013.01); G10L 15/22 (2013.01); G10L 25/30 (2013.01)

(58) Field of Classification Search
CPC ......... G10L 17/26; G10L 25/30; G10L 25/63; G10L 2015/088; G10L 15/08; G10L 2015/227; G10L 15/22
See application file for complete search history.

(56) References Cited

U.S. PATENT DOCUMENTS

| | | |
|---|---|---|
| 10,096,319 B1 | 10/2018 | Jin et al. |
| 11,854,538 B1 * | 12/2023 | Rozgic .................... G10L 25/63 |
| 2010/0036660 A1 * | 2/2010 | Bennett ................... G10L 15/30 |
| | | 704/231 |
| 2014/0112556 A1 * | 4/2014 | Kalinli-Akbacak ......................... |
| | | G06V 40/176 |
| | | 382/128 |
| 2014/0229175 A1 * | 8/2014 | Fischer ................... G10L 15/22 |
| | | 704/235 |
| 2016/0019915 A1 | 1/2016 | Khan et al. |
| 2019/0295533 A1 | 9/2019 | Wang et al. |
| 2019/0355351 A1 | 11/2019 | Kim et al. |
| 2020/0296480 A1 * | 9/2020 | Chappell, III .......... G06F 3/011 |
| 2021/0249035 A1 * | 8/2021 | Bone ....................... G10L 17/04 |
| 2021/0326372 A1 * | 10/2021 | Ramachandra ........ G06N 3/006 |
| 2022/0092378 A1 * | 3/2022 | Sun ......................... G06N 20/00 |
| 2022/0136474 A1 * | 5/2022 | Ostrowski ............. G01S 13/931 |
| | | 123/179.4 |
| 2022/0330786 A1 * | 10/2022 | Miller ..................... D06F 33/32 |

FOREIGN PATENT DOCUMENTS

| | | |
|---|---|---|
| CN | 106650633 A | 5/2017 |
| CN | 109036405 A | 12/2018 |
| CN | 110085211 A | 8/2019 |
| CN | 110782622 A | 2/2020 |
| WO | 2022048347 A1 | 3/2022 |

* cited by examiner

*Primary Examiner* — Huyen X Vo
(74) *Attorney, Agent, or Firm* — BROOKS KUSHMAN P.C.

(57)     ABSTRACT

An interface customized to a detected emotional state of a user is provided. Audio signals are received from at least one microphone, the audio signals being indicative of spoken words, phrases, or commands. A wake-up word (WuW) is detected in the audio signals. An emotion is also detected in the audio signals containing the WuW. An emotion-aware processing system is configured according to the detected emotion. A voice control session is performed using the emotion-aware processing system configured according to the detected emotion.

25 Claims, 3 Drawing Sheets

200

130

WuW Detector
202

ASR/NLU Models
204

Emotion
Detector
206

Emotion Customization
Engine
208

Voice Control Session Recognizer
210

EMOTION-AWARE VOICE ASSISTANT

TECHNICAL FIELD

Described herein are voice assistant systems providing a voice user interface customized to a detected emotional state of the user.

BACKGROUND

Some speech-enabled systems allow for voice triggers to be spoken to begin engaging with the system. A voice trigger may include a designated word or phrase that indicates to the system that the user intends to interact with the system (e.g., to issue one or more commands to the system). Such voice triggers are referred to herein as a "wake-up word" or "WuW" and refer to both single word triggers and multiple word trigger phrases. Typically, once the wake-up word has been detected, the system begins recognizing subsequent speech spoken by the user. In most cases, unless and until the system detects the wake-up word, the system will assume that the acoustic input received from the environment is not directed to or intended for the system and will not process the acoustic input further.

SUMMARY

In one or more illustrative examples, a system for providing an interface customized to a detected emotional state of a user is provided. At least one microphone is configured to produce audio signals indicative of spoken words, phrases, or commands. A processor is programmed to receive the audio signals from the at least one microphone, detect a wake-up word (WuW) in the audio signals, detect an emotion in the audio signals containing the WuW, configure an emotion-aware processing system according to the detected emotion, and perform a voice control session using the emotion-aware processing system configured according to the detected emotion.

In one or more illustrative examples, a method for providing an interface customized to a detected emotional state of a user is provided. Audio signals are received from at least one microphone, the audio signals being indicative of spoken words, phrases, or commands. A WuW is detected in the audio signals. An emotion is detected in the audio signals containing the WuW. An emotion-aware processing system is configured according to the detected emotion. A voice control session is performed using the emotion-aware processing system configured according to the detected emotion.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

A WuW may convey information about the underlying emotional state of the user. This emotional information may be used to improve the operation of a voice assistant system. To do so, the emotion of a WuW spoken by a user may be detected in parallel with the detection of the WuW. This detected emotion may be used to customize a user interface of the voice assistant system. Thus, in addition to triggering an automatic speech recognition (ASR)/natural language understanding (NLU) session to recognize what the user speaks after the WuW, the underlying emotional state of the user may also be derived from the WuW to customize the voice control session.

The customizations of the user interface may be used for various purposes. In an example, the emotional state may be used to signal empathetic capabilities of the speech system through visual feedback or acoustic feedback (referred to herein as an Earcon). In another example, the emotional state may be used to load specific ASR/NLU models or configurations corresponding to the detected emotional context to improve the recognition. For instance, the performance of the ASR/NLU system may be adjusted according to the emotional state through acoustic models, language model weight sets, specific language models, etc. that correspond to the detected emotional state. In yet another example, the emotional state may be used to modify the way and style of the user interface (UI) or virtual assistant (VA) responses, such as its verbosity or its empathetic reaction (e.g., submissive behavior upon aggressive user input). Further aspects of the disclosure are discussed in detail herein.

Figure 1:
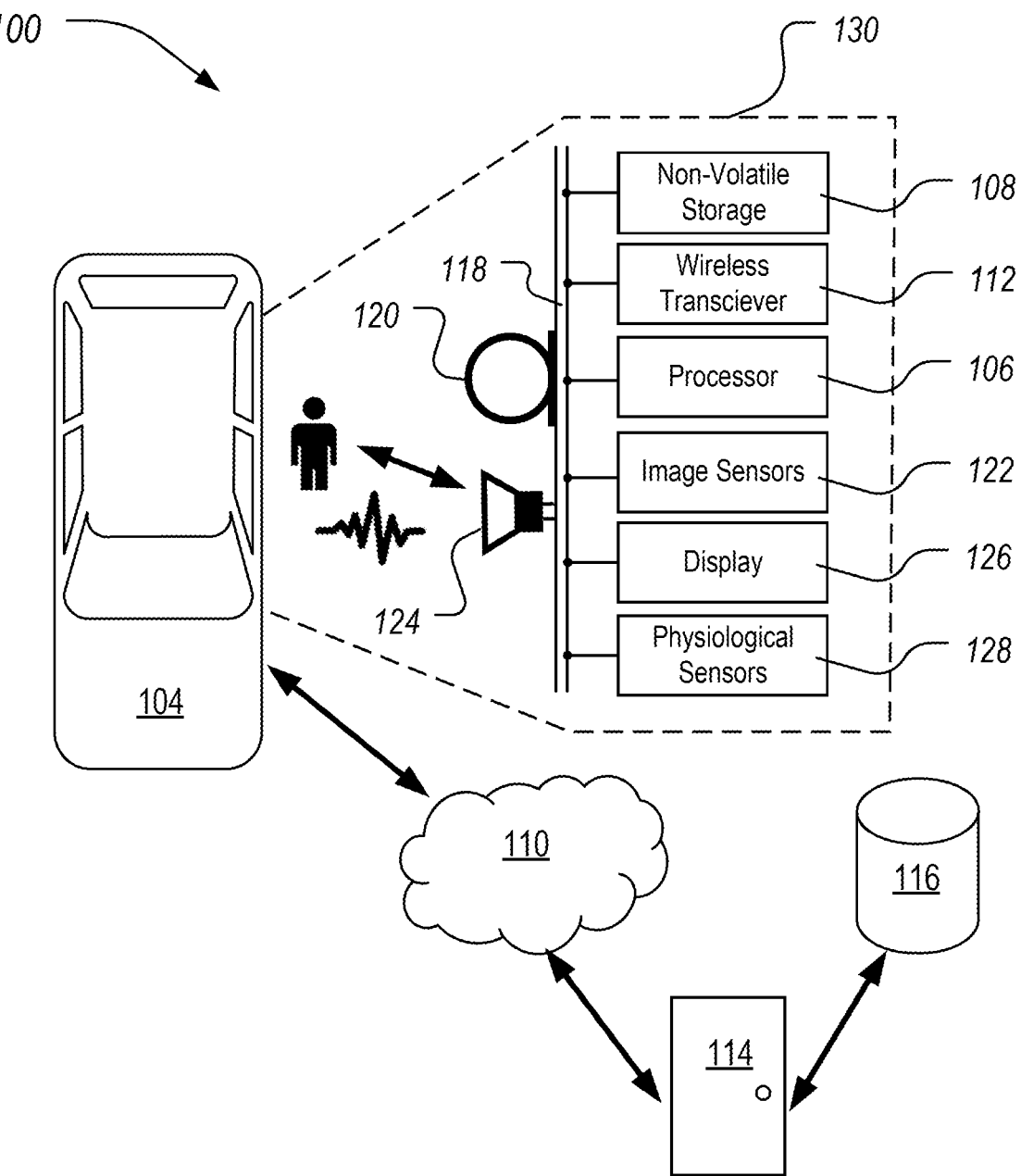
FIG. 1 illustrates a block diagram for a voice assistant system providing an interface customized to the detected emotional state of the user, in accordance with one embodiment.

FIG. 1 illustrates a block diagram for a voice assistant system 100 for providing an interface customized to the detected emotional state of the user, in accordance with an embodiment of the disclosure. In one example, the voice assistant system 100 may be designed for a vehicle 104 configured to transport passengers. The vehicle 104 may include various types of passenger vehicles, such as crossover utility vehicle (CUV), sport utility vehicle (SUV), truck, recreational vehicle (RV), boat, plane or other mobile machine for transporting people or goods. Further, the vehicle 104 may be autonomous, partially autonomous, self-driving, driverless, or driver-assisted vehicles. The vehicle 104 may be an electric vehicle (EV), such as a battery electric vehicle (BEV), plug-in hybrid electric vehicle (PHEV), hybrid electric vehicle (HEVs), etc. While an automotive system is shown in FIG. 1, other environments may be applicable in other embodiments. For instance, similar functionally may be applied to non-automotive environments such as control of a smart speaker or other home device, control of an augmented reality or virtual reality session, control of a phone or other mobile device, etc. While the term "occupant" is used throughout, this term may be interchangeable with speaker, user, or another term for a user interacting via speech with the voice assistant system 100.

The voice assistant system 100 may include one or more processors 106 configured to perform certain instructions, commands and other routines as described herein. The processors 106 may include various general-purpose devices, custom circuits such as application specific integrated circuits (ASICs) or field programmable gate arrays (FPGAs), and/or combinations thereof, that may be operated to perform one or more of the below-described processes of providing an interface customized to the detected emotional state of the user.

The processors 106 may execute instructions for certain applications, including navigation, infotainment, climate control, etc. Instructions for the controlling the processor 106 may be maintained in a non-volatile manner using a variety of types of computer-readable storage medium 108. The computer-readable storage medium 108 (also referred to herein as memory or storage) includes any non-transitory medium (e.g., a tangible medium) that participates in providing instructions or other data that may be read by the processor 106. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, and Perl.

The voice assistant system 100 may be configured to communicate with a communication network 110. The communication network 110 may be referred to as a "cloud" and may involve data transfer via various wide area and/or local area networks, such as the Internet, cellular networks, Wi-Fi, Bluetooth, etc. The communication network 110 may provide various services to the vehicle 104, such as navigation, music or other audio program content, marketing content, internet access, speech recognition, cognitive computing, artificial intelligence computing, etc.

The voice assistant system 100 may include a wireless transceiver 112, such as a BLUETOOTH module, a ZIGBEE transceiver, a Wi-Fi transceiver, an IrDA transceiver, a radio frequency identification (RFID) transceiver, etc.) configured to communicate over the communication network 110. The wireless transceiver 112 may also be used to allow the voice assistant system 100 to communicate with compatible transceivers of various user devices or other vehicles 104 as well.

The communication network 110 may provide for communication between the vehicle 104 and an external or remote server 114 and/or database 116, as well as between other external applications, systems, and/or vehicles 104. The remote server 114 and/or the database 116 may include one or more computer hardware processors coupled to one or more computer storage devices for performing steps of one or more methods as described herein. The remote server 114 and/or the database 116 may accordingly enable the vehicle 104 to communicate and exchange information and data with systems and subsystems external to the vehicle 104 and local to or onboard the vehicle 104.

The voice assistant system 100 may include one or more internal networks 118, such as a vehicle controller area network (CAN), an Ethernet network, and a media-oriented system transfer (MOST), etc. The internal networks 118 may allow the processor 106 to communicate with other vehicle 104 systems, such as a modem, a global navigation satellite system (GNSS) controller configured to provide current location and heading information (not shown), and various electronic control units (ECUs) configured to cooperate with the processor 106.

The voice assistant system 100 may further include various sensors and input devices to support the operation of the interface customized to the detected emotional state of the user. For example, the cabin of the vehicle 104 may include at least one audio sensor 120. In one example, the audio sensor 120 may include an array of microphone elements arranged throughout the cabin. The audio sensor 120 may be configured receive audio signals from within the environment, such as acoustic utterances of spoken words, phrases, or commands from occupants. The audio sensor 120 may include an audio preprocessor configured to provide audio signal processing features, including amplification, conversions, data processing, etc., to the processor 106. The audio sensor 120 may further be used for other environmental features such as active noise cancelation, hands-free interfaces, etc. The signal from the audio sensor 120 may facilitate speech recognition from audio received via the audio sensor 120 according to grammar associated with available commands and voice prompt generation.

The voice assistant system 100 may optionally include at least one image sensor 122 within the environment. The image sensor 122 may be a position sensor and/or camera configured to detect the direction of the user's gaze, occupant gestures, etc. The image sensor 122 may monitor the driver head position, as well as detect any other movement by the occupant, such as a motion with the user's arms or hands, etc. In the example of a camera, the camera may provide imaging data taken of the vehicle 104 occupants to indicate certain movements made by a specific occupant. The image sensor 122 may be capable of taking still images, video and/or of detecting user head, eye, and body movement. In some examples, the image sensor 122 may include multiple imaging elements and the imaging data may be used for qualitative analysis. For example, the imaging data from the image sensor 122 may be used to determine if the user is looking at a certain location or vehicle display 126. Additionally or alternatively, the imaging data may also supplement timing information as it relates to the driver motion.

The voice assistant system 100 may further include an audio system providing audio playback functionality through speakers 124 or headphones located within the environment. The audio playback may include audio from sources such as a radio, including satellite radio, decoded amplitude modulated (AM) or frequency modulated (FM) radio signals, and audio signals from compact disc (CD) or digital versatile disk (DVD) audio playback, streamed audio from a mobile device, commands from a navigation system, etc. The audio playback may also include sounds or text-to-speech (TTS) generated by the voice assistant system 100 to be heard by the occupants of the environment.

The voice assistant system 100 may also include various displays 126 configured to provide visual outputs to occupants of the environment. The displays 126 may include user interfaces, including head-up displays (HUDs), center console displays, steering wheel buttons, etc. In some examples, the displays 126 may include input features such as touch screens configured to receive user input in addition to the showing of information.

The voice assistant system 100 may also include various physiological sensors 128. The physiological sensors 128 may include, in an example, one or more pressure sensors, e.g., to measure the occupant's firmness of grasp of the steering wheel. In another example, the physiological sensors 128 may include one or more skin conductance sensors. For instance, skin conductance sensors may be located on the steering wheel and configured to capture the skin conductance of an occupant holding the steering wheel. In another possibility, skin conductance sensors may be located on a smart watch coupled (e.g., wirelessly) with the voice assistant system 100 to provide skin conductance information to the voice assistant system 100 of the wearer of the smart watch. In yet another example, one or more temperature sensors may be utilized to measure the temperature of occupants of the vehicle 104, e.g., via infrared or a red channel of camera (e.g., the image sensor 122, another sensor, etc.).

At least a subset of the components of the voice assistant system 100 may collectively operate to perform the operations of an emotion-aware processing system 130. The emotion-aware processing system 130 may include various components of the voice assistant system 100, such as the processor 106, computer-readable storage medium 108, audio sensors 120, image sensors 122, speakers 124, displays 126, physiological sensors 128, etc. The emotion-aware processing system 130 may include one or more input and output devices for exchanging data processed by the emotion-aware processing system 130 with other elements shown in FIG. 1.

Figure 2:
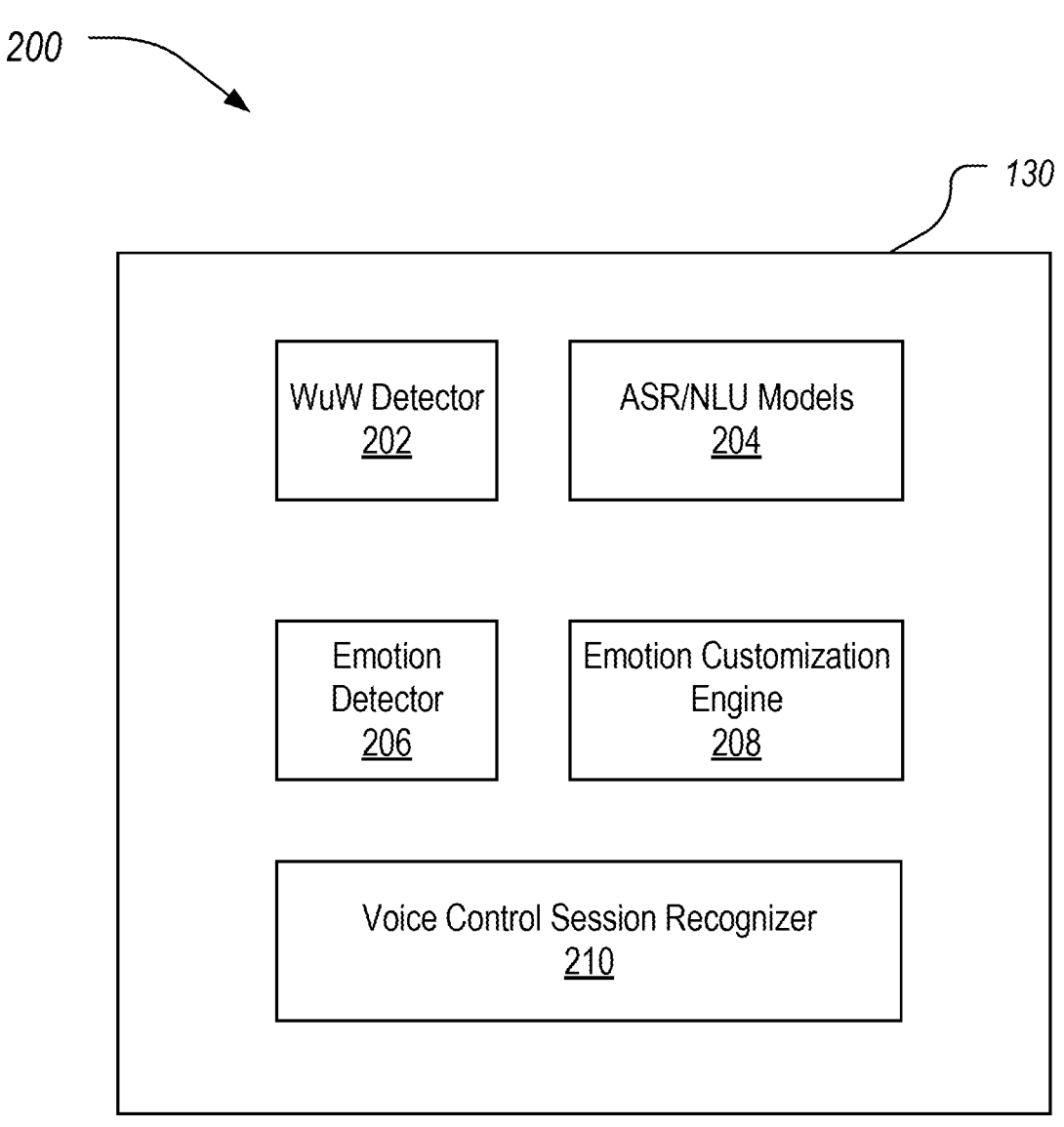
FIG. 2 illustrates an example detail of aspects of the emotional customization application.

FIG. 2 illustrates further aspects of the elements of the emotion-aware processing system 130. As shown, the emotion-aware processing system 130 may include a wake-up word detector 202, one or more ASR models 204, an emotion detector 206, an emotion customization engine 208, and a voice control session recognizer 210.

The wake-up word detector 202 may receive, from the audio sensors 120, signals indicative of sounds captured in the environment. The wake-up word detector 202 may include any suitable system capable of receiving signals representing received sound from the audio sensors 120 and performing wake-up word recognition using the received signals. The wake-up word detector 202 may perform speech recognition on their received acoustic signals to identify whether a wake-up word was spoken. For instance, the wake-up word detector 202 may include an ASR model 204 configured to analyze the sound signals to determine whether that sound includes utterance of a wake-up word. In an example, the ASR model 204 may produce a confidence value that the analyzed acoustic signal included utterance of a wake-up word. This confidence value may be compared with a threshold value above which detection of a wake-up word may be considered to have occurred.

The emotion detector 206 may also receive, from the audio sensors 120, the signals indicative of the sounds captured in the environment. In an example, the emotion detector 206 may analyze the manner in which an utterance is spoken. This may include extracting a set of features (e.g., prosodic, spectral, cepstral, voice quality, etc.), and learning a mapping between those features and respective target emotions. These target emotion representations may be categorical (e.g., neutral, happy, angry, fear, anger, surprise, disgust, another target emotional category, etc.) and/or dimensional (e.g., valence indicative of the pleasantness of a stimulus, arousal indicative of the intensity of the emotion provoked by a stimulus, dominance indicative of the degree of control exerted by a stimulus, etc.) In another example, the emotion detector 206 may learn the features inherently in a mapping directly from the raw waveform data of the signals received from the audio sensors 120. The emotion detector 206 may produce, for each respective target emotion, a confidence values that the analyzed acoustic signal is a match to that target emotion. The most probable prediction of the emotion detector 206 may be taken as the predicted emotion for the received signals.

In some examples, the emotion detector 206 may be configured to additionally or alternately detect emotion of the user based on information received from the image sensor 122. In an example, raw data or processed feature data of the user detected from the image sensor 122 may be applied to a machine learning model to aid in predicting a probable emotional state of the user. For instance, this data from the image sensor 122 may include information such as the status of facial features of the user (smile, frown, tears, red eyes, etc.), coloration of the user, etc., which may be useful clues to the emotional state of the user.

In some examples, the emotion detector 206 may be configured to additionally or alternately detect emotion of the user based on information received from the physiological sensors 128. In an example, raw data or processed feature data of the user detected from the physiological sensors 128 may be applied to a machine learning model to aid in predicting a probable emotional state of the user. For instance, this data from the physiological sensors 128 may include information such as how tightly the steering wheel is being grasped, skin conductance, etc., which may be useful clues to the emotional state of the user.

In some examples, a fused representation of audio, video, and/or psychological features may be used by the emotion detector 206 to produce the confidence values for each respective target emotion, to improve the confidence in the detected emotion as compared to using only audio, only video, or only or psychological features.

The emotion detector 206 may be configured to operate in parallel with the operation of the wake-up word detector 202, to allow the emotion-aware processing system 130 to derive the emotional state of the user from the WuW. As most emotions are conveyed in a first touchpoint with the emotion-aware processing system 130, this may allow for the emotional state to be ready after the first interaction of the user with the emotion-aware processing system 130. Moreover, the emotion detector 206 may be relatively easier to train, as the emotion detector 206 may be trained to detect emotional state on the limited corpus of the WuW, as opposed to having to be trained to identify emotion from general speech input.

The emotion customization engine 208 may be configured to utilize the detected emotional state to customize further interaction of the user with the emotion-aware processing system 130. In an example, the emotion customization engine 208 may utilize the detected emotional state to signal empathetic capabilities of the speech system through visual feedback or acoustic feedback (referred to herein as an Earcon).

In another example, the emotion customization engine 208 may utilize the detected emotional state to load specific ASR/NLU models or configurations corresponding to the detected emotional context in order to improve the recognition. For instance, the performance of the ASR/NLU system may be adjusted according to the emotional state through acoustic models, language model weight sets, specific language models, etc. that correspond to the detected emotional state.

In yet another example, the emotion customization engine 208 may utilize the detected emotional state to modify the way and style of the UI or VA responses such as its verbosity or its empathetic reaction (e.g., submissive behavior upon aggressive user input). Further, a TTS model utilized by the emotion-aware processing system 130 may be configured as well. For instance, if the user is in a good mood, then a first TTS model may be used that provides for lively responses, but if the user is in a poor mood, a sad TTS model may instead be used that provides simple responses.

The voice control session recognizer 210 may be configured to perform a voice control session triggered by the wake-up word detector 202 as configured by the emotion customization engine 208. For example, using the voice control session recognizer 210, the user may ask for directions, locate businesses, order food, or any of various speech session tasks.

Figure 3:
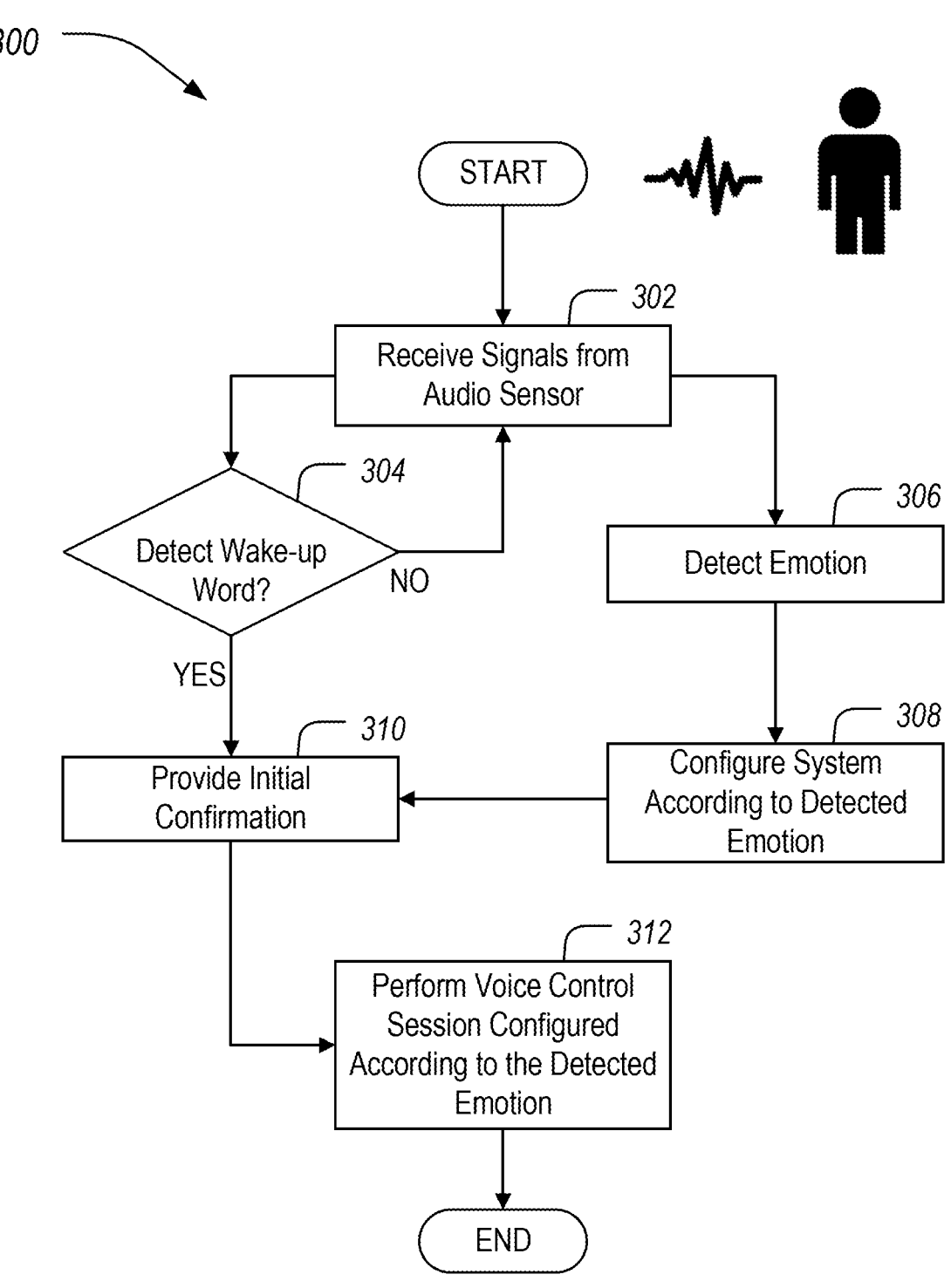
FIG. 3 illustrates an example process for providing an interface customized to the detected emotional state of the user.

FIG. 3 illustrates an example process 300 for providing an interface customized to the detected emotional state of the user. In an example, the process 300 may be performed by the components of the emotion-aware processing system 130 in the context of the voice assistant system 100.

At operation 302, the emotion-aware processing system 130 receives signals from the audio sensor 120. In an example, the audio sensor 120 may produce audio signals indicative of audio waves in the environment and may provide those signals to the processor 106. In some cases, the environment is the cabin of a vehicle 104. In other cases, the environment is a room of a building, or an outdoor arena. In yet other cases, the environment is augmented reality or virtual reality living environment.

At operation 304, the emotion-aware processing system 130 detects a WuW in the audio signals. In an example, the emotion-aware processing system 130 may utilize the WuW detector 202 to identify whether a WuW is located in the same audio signals captured by the audio sensor 120.

At operation 306, the emotion-aware processing system 130 detects emotion in the audio signals. In an example, the emotion-aware processing system 130 may utilize the emotion detector 206 to identify the emotion of the same audio signals detected as including the WuW. In another example, the emotion detector 206 may further utilize additional sources of information, such as image data from an image sensor 122 and/or physiological data from physiological sensors 128 to augment the identification of the emotion of the user.

At operation 308, the emotion-aware processing system 130 configures the emotion-aware processing system 130 according to the emotion detected at operation 306. For instance, audio user interfaces may play an Earcon of a short melodic tone to confirm that the voice control session recognizer 210 is now listening to user utterances. The specific melody or chord that is played may be altered based on the detected emotion in the WuW. This may allow the emotion-aware processing system 130 to provide an initial emotional customization in the first response back to the user from the emotion-aware processing system 130. In an example, responsive to the detected emotion indicating that sadness is detected, the Earcon may be customized to play a longer major chord to cheer the user up. In another example, responsive to the detected emotion indicating that happiness is detected, the Earcon may be customized to play a shorter major chord spread over more octaves.

As another possibility, visual user interfaces may provide alternative of complementary visual feedback instead of or in addition to the indication provided via the audio user interface. In an example, different colors and/or symbols may be displayed to the displays 126 based on the detected emotion. In a more specific example, responsive to the detected emotion indicating that anger or aggressiveness is detected, a red visual feedback may be displayed. As yet another possibility, in the case of detected emotions that are more assertive, an Earcon may be replaced by a speech confirmation to address the assertive condition of the user.

In an example, the emotion-aware processing system 130 may dynamically load a context-specific acoustic model (AM) based on the detected emotion. For instance, the emotion-aware processing system 130 may use an AM specific to anger responsive to the detected emotion indicating anger. In another example, the emotion-aware processing system 130 may replace specific layers or transformations in a deep neural network (DNN) based on the detected emotion.

In another example, the emotion-aware processing system 130 may dynamically load context-specific language models (LM) and/or LM weight sets based on the detected emotion. In an example, if an agitated or angry emotion is detected, the emotion-aware processing system 130 may load a LM to favor the recognition of expletives that may not otherwise be recognized using a LM loaded in a happy emotional state.

In yet another example, the emotion-aware processing system 130 may dynamically load NLU models based on the detected emotion. In an example, the emotion-aware processing system 130 may load a specific NLU model to facilitate and/or support emotion-aware NLU models for the recognition of the user input after the WuW.

As another possibility, the verbosity of the prompts of the emotion-aware processing system 130 may be changed based on detected emotion. In an example the verbosity may change based on the detected emotion to select from no answer prompts to user input, small answer prompts to user input, medium answer prompts to user input, or long answer prompts to user input. In another example, the TTS style of the answer prompt may change using an emotional TTS specific to the detected emotion (e.g., a first TTS for happy users, a second, different TTS for unhappy users, etc.). In yet another example, responsive to the detected emotion indicating anger, the prompt may be played in an apologetic TTS style. In a further example, wording and intonation of responses may be adjusted based on detected emotion, e.g., submissive responsive to detected of an aggressive user input or aggressive upon aggressive input.

In yet a further example, modalities may be initiated to support the answer prompt based on the detected emotion. As a possibility, responsive to the emotion detected in the WuW, the emotion-aware processing system 130 may adjust to using one or more of visual feedback, haptic or tactile feedback, olfactory feedback, gustatory feedback, etc.

At operation 310, the emotion-aware processing system 130 provides an initial confirmation to the user. This initial confirmation to the user may have been configured at operation 308 based on the emotional state detected at operation 306. In an example, the emotion-aware processing system 130 may provide a confirmation that the WuW was detected and that a voice control session has been initiated. This confirmation may include one or more of a visual confirmation (e.g., via the displays 126), an Earcon (e.g., provided to the speakers 124), and/or a speech confirming the session (e.g., provided to the speakers 124).

At operation 312, the emotion-aware processing system 130 performs a voice control session configured according to the detected emotion. In an example, the voice control session recognizer 210 may perform a voice control session triggered by the wake-up word detector 202 as detected at operation 306, configured by the emotion customization engine 208 at operation 308. After operation 312, the process 300 ends.

Thus, in parallel to triggering an ASR/NLU instance to recognize what the user speaks after the WuW, the underlying emotional state of the user may be derived at least in part from the WuW. As most emotions are conveyed in a first touchpoint with the emotion-aware processing system 130, this may allow for the emotional state to be ready after the first interaction of the user with the emotion-aware processing system 130. Moreover, the emotion detector 206 may be relatively easier to train as the emotion detector 206 may be trained to detect emotional state on the more limited corpus of the WuW, as opposed to on any general speech input. The emotion customization engine 208 may be configured to utilize the detected emotional state to customize further interaction of the user with the emotion-aware processing system 130. Accordingly, the detection of the emotion of a WuW spoken by a user may be used to enable and build an empathetic user interface.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (erasable programmable read-only memory (EPROM) or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

The flowcharts and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for providing an interface customized to a detected emotional state of a user, comprising:

at least one microphone configured to produce audio signals indicative of spoken words, phrases, or commands; and a processor programmed to:

receive the audio signals from the at least one microphone, detect a wake-up word (WuW) in the audio signals, detect, in parallel to the detection of the WuW, an emotion in the audio signals detected as containing the WuW using an emotion detector, the emotion detector being trained to detect emotional state in the audio signals on a corpus of audio signals containing the WuW alone, responsive to detection of the WuW and the emotion, configure an emotion-aware processing system according to the detected emotion, and perform a voice control session triggered by the detected WuW, using the emotion-aware processing system configured according to the detected emotion to recognize and respond to additional spoken input.

2. The system of claim 1, wherein the processor is further programmed to:

utilize an automatic speech recognition (ASR) model to analyze the audio signals to produce a confidence value that the audio signals includes an utterance of the WuW;

compare the confidence value with a threshold value above which detection of the WuW is considered to have occurred;

detect the WuW and the emotion in the audio signals responsive to the confidence value exceeding the threshold value.

3. The system of claim 1, wherein the processor is further programmed to:

produce, for each of a plurality of target emotions, a confidence value that the audio signals are a match to that respective target emotion; and identify the emotion as being the one of the plurality of target emotions corresponding to a most probable of the confidence values.

4. The system of claim 3, wherein the processor is further programmed to:

utilize the emotion detector to extract a set of features from the audio signals including the WuW and compare the set of features to the plurality of target emotions to determine the confidence values, wherein the set of features includes one or more of prosodic features, spectral features, cepstral features, and/or voice quality features.

5. The system of claim 4, wherein the processor is further programmed to include raw data and/or processed feature data of the user detected from an image sensor as further inputs to the emotion detector to augment the detection of the emotion in the audio signals.

6. The system of claim 4, wherein the processor is further programmed to include raw data and/or processed feature data of the user detected from a physiological sensor as further inputs to the emotion detector to augment the detection of the emotion in the audio signals.

7. The system of claim 3, wherein the plurality of target emotions include categorical emotions, the categorical emotions including one or more of a neutral emotion, a happy emotion, an angry emotion, or another target emotional category.

8. The system of claim 3, wherein the plurality of target emotions include dimensional emotions, the dimensional emotions including components of one or more of valence, arousal, and dominance.

9. The system of claim 1, wherein to configure the emotion-aware processing system according to the detected emotion includes to provide visual feedback based on the detected emotion.

10. The system of claim 1, wherein to configure the emotion-aware processing system according to the detected emotion includes one or more of to:

dynamically load a context-specific acoustic model (AM) based on the detected emotion;

dynamically load a context-specific language model (LM) and/or a LM weight set based on the detected emotion; or dynamically load a natural language understanding (NLU) model based on the detected emotion.

11. The system of claim 1, wherein to configure the emotion-aware processing system according to the detected emotion includes one or more of to:

adjust verbosity of prompts of the voice control session based on the detected emotion; or adjust wording and intonation of responses of the voice control session based on the detected emotion.

12. The system of claim 1, wherein to configure the emotion-aware processing system according to the detected emotion includes to play an Earcon that is customized to the detected emotion.

13. The system of claim 12, wherein the Earcon is played to confirm that the voice control session is now listening to user utterances.

14. The system of claim 1, wherein to configure the emotion-aware processing system according to the detected emotion includes to adjust a modality of feedback to the user based on the detected emotion.

15. A method for providing an interface customized to a detected emotional state of a user, comprising:

receiving audio signals from at least one microphone, the audio signals being indicative of spoken words, phrases, or commands;

detecting a wake-up word (WuW) in the audio signals;

detecting, in parallel to the detection of the WuW, an emotion in the audio signals detected as containing the WuW using an emotion detector, the emotion detector being trained to detect emotional state on a corpus of audio signals containing the WuW alone;

responsive to detection of the WuW and the emotion, configuring an emotion-aware processing system according to the detected emotion; and performing a voice control session triggered by the detected WuW, using the emotion-aware processing system configured according to the detected emotion to recognize and respond to additional spoken input.

16. The method of claim 15, further comprising:

utilizing an automatic speech recognition (ASR) model to analyze the audio signals to produce a confidence value that the audio signals includes an utterance of the WuW;

comparing the confidence value with a threshold value above which detection of the WuW is considered to have occurred; and detecting the WuW and the emotion in the audio signals responsive to the confidence value exceeding the threshold value.

17. The method of claim 15, further comprising:

producing, for each of a plurality of target emotions, a confidence value that the audio signals are a match to that respective target emotion; and identifying the emotion as being the one of the plurality of target emotions corresponding to a most probable of the confidence values.

18. The method of claim 17, further comprising:

utilizing the emotion detector to extract a set of features from the audio signals including the WuW and compare the set of features to the plurality of target emotions to determine the confidence values, wherein the set of features includes one or more of prosodic features, spectral features, cepstral features, voice quality features.

19. The method of claim 18, further comprising including raw data and/or processed feature data of the user detected from an image sensor as further inputs to the emotion detector to augment the detecting of the emotion in the audio signals.

20. The method of claim 18, further comprising including raw data and/or processed feature data of the user detected from a physiological sensor as further inputs to the emotion detector to augment the detecting of the emotion in the audio signals.

21. The method of claim 17, wherein the plurality of target emotions include categorical emotions the categorical emotions including one or more of a neutral emotion, a happy emotion, an angry emotion, or another target emotional category.

22. The method of claim 17, wherein the plurality of target emotions include dimensional emotions, the dimensional emotions including components of one or more of valence, arousal, and dominance.

23. The method of claim 15, wherein to configure the emotion-aware processing system according to the detected emotion includes one or more of:

playing an Earcon based on the detected emotion;

providing visual feedback based on the detected emotion; or adjusting a modality of feedback to the user based on the detected emotion.

24. The method of claim 15, wherein to configure the emotion-aware processing system according to the detected emotion includes one or more of:

dynamically loading a context-specific acoustic model (AM) based on the detected emotion;

dynamically loading a context-specific language model (LM) and/or a LM weight set based on the detected emotion; or dynamically loading a natural language understanding (NLU) model based on the detected emotion.

25. The method of claim 15, wherein to configure the emotion-aware processing system according to the detected emotion includes one or more of:

adjusting verbosity of prompts of the voice control session based on the detected emotion; or adjusting wording and intonation of responses of the voice control session based on the detected emotion.

* * * * *